United States Patent
Minsky

(10) Patent No.: US 9,652,795 B2
(45) Date of Patent: May 16, 2017

(54) METHOD FOR A CANVASSED SELF HEALING BULLETIN BOARD

(71) Applicant: Schner Minsky, Brooklyn, NY (US)

(72) Inventor: Schner Minsky, Brooklyn, NY (US)

( * ) Notice: Subject to any disclaimer, the term of this patent is extended or adjusted under 35 U.S.C. 154(b) by 707 days.

(21) Appl. No.: 14/133,196

(22) Filed: Dec. 18, 2013

(65) Prior Publication Data

US 2014/0108205 A1    Apr. 17, 2014

Related U.S. Application Data

(62) Division of application No. 13/317,396, filed on Oct. 17, 2011, now abandoned.

(51) Int. Cl.
| | |
|---|---|
| G06Q 30/00 | (2012.01) |
| G06Q 30/06 | (2012.01) |
| B32B 21/02 | (2006.01) |
| B32B 27/02 | (2006.01) |
| B32B 3/10 | (2006.01) |
| G06Q 30/02 | (2012.01) |

(Continued)

(52) U.S. Cl.
CPC ........... *G06Q 30/0621* (2013.01); *B32B 3/10* (2013.01); *B32B 5/022* (2013.01); *B32B 21/02* (2013.01); *B32B 21/10* (2013.01); *B32B 27/02* (2013.01); *G06Q 30/0241* (2013.01); *G06Q 30/0635* (2013.01); *G09F 15/0006* (2013.01); *B32B 2457/00* (2013.01); *B32B 2590/00* (2013.01); *Y10T 428/2481* (2015.01); *Y10T 428/24802* (2015.01)

(58) Field of Classification Search
CPC   G06Q 30/06; G06Q 30/0601–30/0643; G09B 29/006; G09F 7/02; G09F 7/06; B32B 27/12; B44C 5/02; B44C 5/04; Y10T 428/1486
See application file for complete search history.

(56) References Cited

U.S. PATENT DOCUMENTS

| | | |
|---|---|---|
| 1,494,583 A | 5/1924 | Brooks |
| 4,787,516 A | 11/1988 | Morrison |

(Continued)

OTHER PUBLICATIONS

"How to make a large, customer bulletin board". www.shortstopblog.com. Sep. 30, 2009.*

(Continued)

*Primary Examiner* — William Allen
(74) *Attorney, Agent, or Firm* — Benjamin Davis

(57) ABSTRACT

The present invention generally relates to a method for converting a client order into a custom canvassed bulletin board, where the client accesses a board maker's web site and uploads a digital image over the internet to a server. The client verifies the uploaded image, selects an image print size, and submits personal information to the server. The uploaded image is retrieved by the board maker and resized. The board maker prints the image onto a canvas, fixes the printed canvas onto a bulletin board, and delivers the custom board to the client. The bulletin board can be framed, hung on a surface, used with push pins to attach messages to the canvassed surface, or be used as decorative art. Cork's self-healing properties causes holes through the printed canvas and tack receptive cork layers to close up and restore the printed image to its near original quality.

7 Claims, 2 Drawing Sheets

(51) Int. Cl.
    *B32B 5/02*     (2006.01)
    *B32B 21/10*     (2006.01)
    *G09F 15/00*     (2006.01)

(56) References Cited

U.S. PATENT DOCUMENTS

| | | | |
|---|---|---|---|
| 4,893,425 A | 1/1990 | Ellis | |
| 6,583,799 B1 | 6/2003 | Manolis | |
| 7,503,136 B1 | 3/2009 | McDonald | |
| 8,731,703 B1* | 5/2014 | Lehrer | G06F 3/1257 700/132 |
| 2003/0058457 A1* | 3/2003 | Fredlund | G06Q 30/06 358/1.2 |
| 2004/0003525 A1* | 1/2004 | Daryabagi | G09F 1/12 40/584 |
| 2006/0150454 A1 | 7/2006 | Kang | |
| 2008/0043087 A1* | 2/2008 | Cowan | C12N 15/8247 347/213 |
| 2008/0107837 A1* | 5/2008 | Spetner | B32B 27/12 428/14 |
| 2008/0154750 A1* | 6/2008 | Hegemier | G06Q 10/087 705/28 |
| 2009/0297753 A1* | 12/2009 | Romanik | G09F 7/02 428/42.1 |
| 2010/0036753 A1* | 2/2010 | Harvill | G06Q 30/06 705/26.1 |
| 2011/0145100 A1 | 6/2011 | Berger | |

OTHER PUBLICATIONS www.fabricondemand.com. Nov. 22, 2010. [recovered from www.archive.org].*

* cited by examiner

METHOD FOR A CANVASSED SELF HEALING BULLETIN BOARD

CROSS REFERENCE TO RELATED APPLICATIONS

This divisional application claims priority to non-provisional patent application Ser. No. 13/317,396 filed on Oct. 17, 2011.

FIELD OF THE INVENTION

The present invention generally relates to a method for converting a client order into a custom canvassed bulletin board. More specifically, the present invention includes a client uploading an image to a server via the internet, submitting their personal information to the server, after which a board maker retrieves the client's uploaded image from the same, prints the image onto a canvas, and then uses the printed canvas to create a decorative self-healing bulletin board. The bulletin board can be used as a message board with push pins and notes or can be used as decorative art. The board uses adhesives and cork's self-healing properties to repair push pin holes in the canvas surface, thereby restoring the canvas and printed image to near original quality.

BACKGROUND OF THE INVENTION

Today's technology allows people to create custom items from digital images. However, having this flexibility does not allow certain items to be customized due to their construction. One such item is a traditional cork board.

Cork bulletin boards are well known in the art. Cork boards have tackable surfaces, where push pins or thumb tacks are used to attach notes. Due to cork's elastic properties, holes created by a push pin close automatically upon removal of the spike, but heavy use over time destroys the cork. Taking care when inserting and removing push pins is crucial to the longevity of the cork board. Cork should not be written on directly, meaning it is better not to write or mark on cork, which makes cork difficult to use as a printing surface.

If one wanted to fix a custom image to a cork bulletin board, then one would have to glue or staple construction paper, cloth, or some sort of poster with an image onto the cork surface. However, using pins or staples to attach notes or items to the image would cause irreversible damage to the picture.

U.S. Pat. No. 1,494,583 to Brooks describes how to make a cork bulletin board.

U.S. Pat. No. 7,503,136 to McDonald describes a bulletin board for educational use having an outer fabric layer with a map print, a cork layer, and a foam support.

U.S. Pat. No. 4,893,425 to Ellis describes a display board having plastic foam covered with a closely fitted cloth or fabric.

Patent App. No. 20060150454 to Kang describes a push-pin board for retaining and displaying messages.

U.S. Pat. No. 4,787,516 to Morrison describes a storage and display device for pieced earrings having a framed cork surface.

Patent App. No. 20110145100 to Berger et al. describes for digitally processing a stationary order over the internet.

U.S. Pat. No. 6,583,799 to Manolis et al. describes a computer implemented method for uploading a digital image to a server.

The listed references do not address customizing a canvassed bulletin board according to a client order. Therefore, there is a need for a method that converts a client order into a canvassed bulletin board that not only serves as a message board but can be used as fine art in one's home or office, where push pins can be inserted and removed with very little damage to the image printed on the canvas.

SUMMARY OF THE INVENTION

The primary objective of the present invention is to provide a method for creating a self healing bulletin board having the steps of uploading a digital image over a Network from a first computer into a matrix located on a remote server, compressing the digital image into a thumbnail by the remote server and then sending the thumbnail to the first computer for verification, wherein the remote server presents resizing options to the first computer for selection, returning a verification of the thumbnail and at least one selected resizing options for the original uploaded digital image from the first computer to the remote server, after receiving verification and selection of at least one resizing option, resizing, by a second computer the original uploaded digital image from the remote server to create a resized digital image and sending the resized digital image to a printer in communication with the second computer, printing, by the printer, the resized image onto a canvas with solvent based inks, and forming the self-healing bulletin board by bonding the canvas having the resized image printed thereon to a tack receptive layer and bonding the tack receptive layer to a solid support.

It is another aspect of the invention where the canvas has 3 oz. per lineal yard of poly-cotton osnaburg and 17 oz. per lineal yard of vinyl materials, where the canvas has a thickness from 0.015 inches to 0.030 inches, where the canvas' top surface can absorb solvent based inks, and where the canvas' back surface comprises the same poly-cotton osnaburg adhered to a vinyl based polymer.

It is another aspect of the present invention wherein the self-healing bulletin board comprises a canvas being a poly-cotton hybrid.

It is another aspect of the present invention wherein a printer applies solvent based inks to print the uploaded digital image onto the top surface of the canvas layer.

It is another aspect of the present invention wherein the tack receptive layer is a cork sheet or a cork hybrid sheet having polymer or rubber particulates, where each cork sheet is an ⅛ inch to about a ¼ inch in thickness.

It is another aspect of the present invention wherein the solid support may be made from a wood fiber, a particle fiber, or a hard wood fiber, where the solid support is a ¼ inch to about a ½ inch in thickness.

It is another aspect of the present invention wherein the original uploaded image ranges is size from 1 KB to 200 MB and is at least one mega pixel in size.

BRIEF DESCRIPTION OF THE DRAWINGS

The following figures are examples of the present invention and are not a limitation thereof.

DETAILED DESCRIPTION OF THE INVENTION

Figure 1:
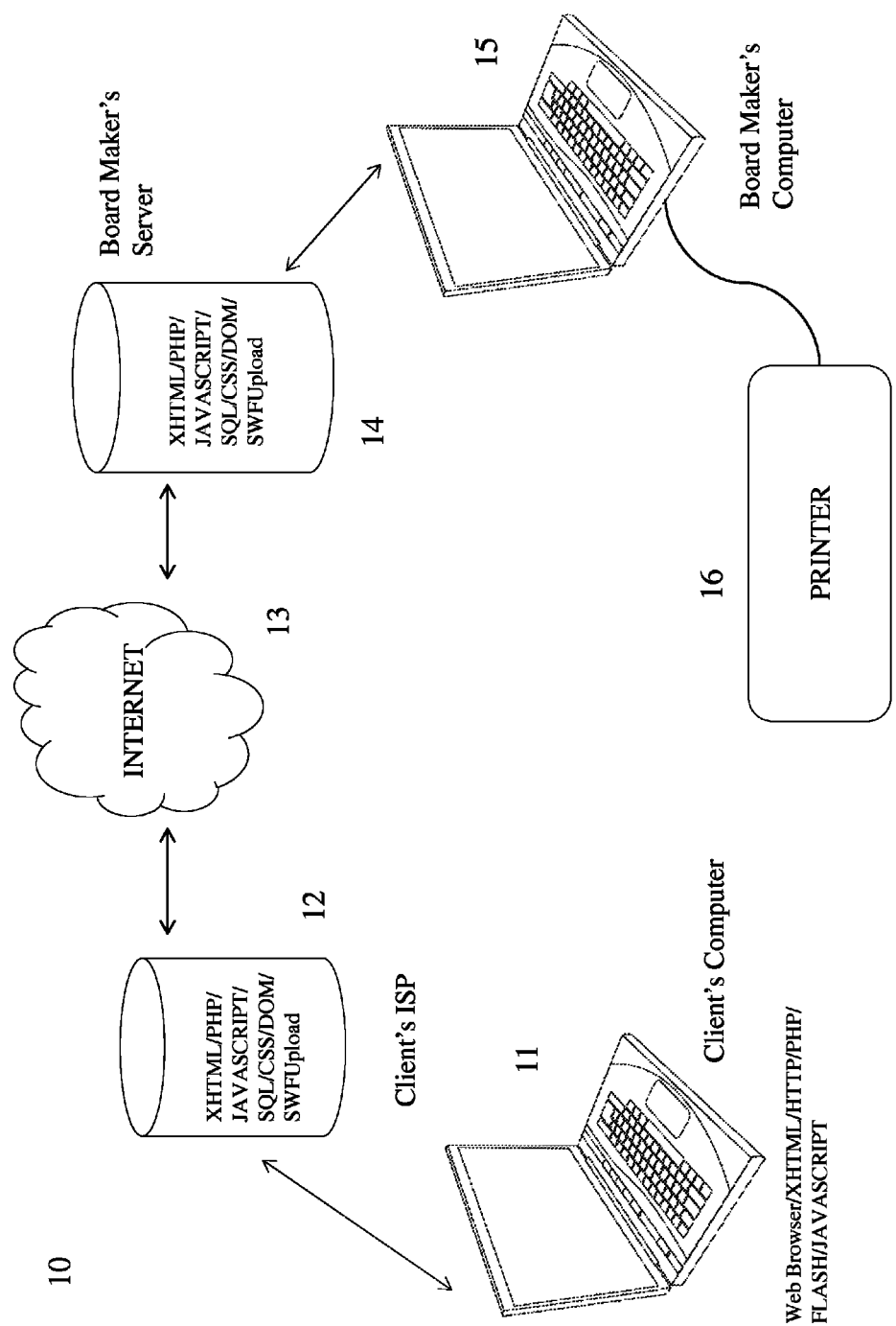
FIG. 1 is a sketch of the web based process 10 to convert a client order into a canvassed self healing bulletin board.

From this point forward, the following words will describe a method for creating a canvassed bulletin board that self-heals. However, these words are not a limitation on the scope of the present invention but are written to detail certain embodiments thereof, and due to the detailed description, modifications will become apparent to those skilled in the art.

The present invention includes a client's web browser accessing a board maker's web site and uploading at least one digital image over the internet to a remote server. The board maker's web site allows the client to verify the image uploaded to the server, select an image print size, and submit his or her personal information to the server. The uploaded image is retrieved by the board maker via a web browser and is resized. The board maker prints the image onto a canvas, fixes the printed canvas onto a bulletin board, and ships the bulletin board to the client. The bulletin board can be framed or hung to a surface, be used with push pins to attach notes and messages to the canvassed surface, or can be used as decorative art. When used as a message board, cork's self-healing properties enable the holes made by push pins in the canvas and cork layer to close up and restore the printed image to its near original quality.

General Embodiment of the Invention

Definitions

The following non-limiting terms are used to detail the invention:

The term "digital image" generally refers to a numeric representation (normally binary) of a two-dimensional image, a photo. Depending on whether or not the image resolution is fixed, it may be of vector or raster type. The term may also refer to raster images that have been compressed called bitmap images. Web browsers can display standard internet image formats including GIF, JPEG, and PNG, bitmap formats.

The term "computer" generally refers to a personal workstation, a minicomputer, a mainframe, a supercomputer, or a web or computer server. The computer should have a basic operating system such as MS Windows, Linux, Mac OS, and the like. The computer may be a desktop, server, portable, hand-held, set-top, or any other desired configuration. The computer includes a processor and a data storage system and typically receives a number of inputs and outputs for communicating information externally. Non-limiting examples of inputs and outputs may include: a keyboard, a mouse, a trackball, a joystick, a touchpad, and/or a microphone, a CRT monitor, and/or an LCD display panel. The present invention refers to use of computers as a client's computer and a board maker's computer, which is a first and second computer respectively.

The terms "web browser" or "browser" generally refer to Microsoft Internet Explorer, Firefox, Netscape, Opera, Safari, or any compatible web browser, where the browser is capable of rendering HTML, XHMTL, DOM, CSS, Javascript, XML, XML/HTTP requests, HTTP/HTTPS/PHP scripts, Flash Tools, e.g. SWFUpload, or the like and may provide navigation to web pages via hypertext links One embodiment of the present invention includes using a combination of XHTML, client side scripting language such as Javascript or PHP, SWFUpload, a presentation definition language (CSS), and DOM.

The term "mobile device" generally refers to any device capable of wireless communication and connection to the internet. More specifically, this means SMS or MMS servicing with a web browser capable of connecting to the internet via wi-fi or through a cell phone service. This includes, but is not limited to, cellular phones, personal digital assistants, and/or handheld (mobile) computer devices such as internet capable tablets.

The terms "module" or "modules" generally refer to a part of a computer program, sub-routine, procedure, definitional statement, and/or macro that performs a distinct function. Each module may be separately compiled and linked into a single executable program. The module processes may be arbitrarily redistributed to one of the other modules, combined together in a single module, or made available in, for example, a shareable dynamic link library. Non-limiting examples being modules capable of taking requests or giving commands as SWFUpload/PHP/Javascript commands for uploading digital images with a mobile device or home computer to a server over a network, where, for example, cell phones may use modules that can have an SMS gateway to convert an SMSC protocol to SWFUpload/PHP/Javascript or HTTP/HTTPS/PHP scripts, DOM, CSS, XML, XHTML/HTTP requests, SQL request or commands, flash tools, or the like.

The terms "internet," "network," or "web" generally refer to an electronically connected group of computers including but not limited to: the World Wide Web, Intranet, Local Area Networks (LAN), Wide Area Networks (WAN), or Wireless Wide Area Networks (WWAN). The internet transfers information using common protocol that tells computers connected to the network how to locate and exchange files with each other.

The term "server" generally refers to a private computer that links other computers or electronic devices together and is accessible over a network. The server may have a database that is relational and stores a collection of data on individual tables with common or uncommon information. The server is operated and controlled by a private firm. A server administrator may implement and maintain the system and establish policies and procedures pertaining to management, security, maintenance, and use of the server management system. The server of the present invention may understand programming languages including but not limited to: HTTP/HTTPS, DOM, CSS, Javascript, XML, XHTML/HTTP requests, SQL request or commands, PHP scripts, Flash Tools, and the like.

The term "client matrix" or "matrix" generally refer to a collection of client information stored on individual tables in a relational database. The matrix, and therefore the database, is located on a remote server. The matrix contains at least one original uploaded digital image and XHTML script for information regarding the resulting client order as metadata, which the board maker accesses and uses to create and ship the bulletin board to the client. The database is accessible over the internet and is kept by a private firm, non-limiting examples being MySQL, Interbase/Firebird, PSQL, IBM, Microsoft/Sybase, Oracle, or the like, where a firm has a database administrator or one or more applications developers. The database is associated with at least one send/receive module that can convert XHTML, PHP, HTTP, SWFUpload, PHP, CSS, HTML, DOM, or HTTP requests or any combinations thereof from a client's or board maker's browser to structured language queries to import client information and digital images into tables within the database and may return such data to the client's or board maker's browser.

Client Order—Step One: Image Uploading

The following method describes how a client order is converted by a board maker into a custom canvassed bulletin board. From FIG. 1, a client uses a computer 11 connected to the internet 13 to access a board maker's web site via HTML/PHP/HTTP requests. The client's internet service provider (ISP) has computer servers 12 that facilitate the web connection between the server 14, the internet cloud 13, and the client's computer 11 by send/receive modules or platforms known in the art. The ISP server 12 may understand programming languages including but not limited to: HTTP/HTTPS; DOM; CSS; Javascript; XML; XML/HTTP requests; SQL request or commands; PHP scripts; Flash Tools, and the like. The ISP server 12 renders XHTML/PHP/HTTP/Javascript/MySQL commands and requests for the board maker's XHTML pages originating at the server 14 and handles file transfers from the client's computer 11 to the server 14.

The board maker's web site presents an initial web page to the client's browser with a button that prompts a server 14 request for the location of the client's digital image. The digital image can be located on the client's computer 11 hard drive, computer 11 desktop, flash drive, mobile device, or any storage location on an electronic device with the ability to connect to the internet 13 and store digital photos, a non-limiting example being a cell phone or computer tablet having a camera, with RAM storage, and is connected to the internet. It is within the scope of the present invention where the client may upload digital images to the server 14 from a third party web site or application via PHP/XHTML/API modules known in the art, non limiting examples being a client uploading a digital image from Filch, Facebook, or the like via flash tools or XHTML/PHP/Javascript/API protocols. The digital image may also include images of restaurant menus, calendars, or any business advertising image.

To upload digital images to the server 14, at least one graphical user interface, GUI, e.g. a button, upload progress handler, or the like, is presented at the client's computer 11 in a web browser over the internet 13. The client clicks a button and at least one module at the server 14 enacts PHP/SWFUpload/Javascript commands that request the file location and digital image for uploading to the server 14. The client selects the location and image for upload. Modules receiving those commands at the server 14 upload the image into a client matrix at the server 14. When the image is uploading to the server 14, the client sees an upload progress handler indicating in real time how much of the file has been imported into the client matrix.

SWFUpload is a client-side file upload tool, which combines Flash and JavaScript to provide file upload functionality to a basic browser. Web developers can use XHTML, CSS, and JavaScript to tailor the upload GUI. A real time upload status is made through a set of simple JavaScript events. The developer uses these events to update upload progress in a web page. A standard HTML upload provides an input box and a button for the user to select a file. The entire file must be uploaded before the next page is displayed. SWFUpload uses a Flash movie to handle file selection and upload. A customizable button is displayed by the Flash movie that activates Flashes advanced file selection dialog window. The file selection dialog is configured to allow the client to select a single file or multiple files.

Once selected, each file is validated and queued. As the file is uploaded by Flash, several JavaScript events are enabled that the developer handles in order to update the page's GUI, which allows the board maker's site to provide an upload status or error message in real-time.

The uploaded file is submitted separately from the rest of the page and the subsequent client form. Each file is uploaded individually keeping the server-side upload handling script simple. Since Flash is providing the upload service, the page does not have to be submitted or reloaded. The page's form will be processed separately from the file upload.

Below is a non-limiting example of how a digital image maybe be uploaded from a client's computer 11 to a remote server 14 over the internet 13 by web browsers via SWFUload/Javascript/XHTML, where the following script gives functionality to an upload button; a progress handler; and sets non-limiting physical dimensions for uploaded digital images:

```
<link href="css/default.css" rel="stylesheet" type="text/css" />
<script type="text/javascript" src="js/swf/swfupload.js"></script>
<script type="text/javascript" src="js/swf/handlers_canvas.js"></script>
<script type="text/javascript">
var swfu;
window.onload = function ( ) {
    swfu = new SWFUpload({
        // Backend Settings
        upload_url: "../../upload/?SSID=
        4eh6kb49csgseqq1nfa3vrn7se3",
        // Relative to the SWF file or absolute
        post_params: {"PHPSESSID":
        "90tgi1bhjpqqis6h6esqhi7s03"},
        // File Upload Settings
        file_size_limit : "100 MB",     // 2MB
        file_types : "*.jpg;*.tif",
        file_types_description : "JPG Images",
        file_upload_limit : "0",
        // Event Handler Settings - these functions as defined in
        Handlers.js
        // The handlers are not part of SWFUpload but are part of my
        // website and control how my website reacts to the
        SWFUpload events.
        file_queue_error_handler : fileQueueError,
        file_dialog_complete_handler : fileDialogComplete,
        upload_progress_handler : uploadProgress,
        upload_error_handler : uploadError,
        upload_success_handler : uploadSuccess,
        upload_complete_handler : uploadComplete,
        // Button Settings
        button_image_url : "images/swf/GetStarted.png", //
        Relative to the SWF file
        button_placeholder_id : "spanButtonPlaceholder",
        button_width: 287,
        button_height: 43,
        button_text : ' ',
        button_text_style : '.button {font-family:Helvetica,
        Arial, sans-serif;font-size: 518pt #7FAAFF; } ',
        button_text_top_padding: 0,
        button_text_left_padding: 0,
        button_window_mode:
        SWFUpload.WINDOW_MODE.TRANSPARENT,
        button_cursor: SWFUpload.CURSOR.HAND,
        // Flash Settings
        flash_url : "js/swf/swfupload.swf",
        custom_settings : {
        upload_target : "divFileProgressContainer"
        },
        // Debug Settings
        debug: false
    });
};
```

When the image has been imported into the matrix, the client is prompted to the next page. If the image is too large or too small or is corrupt, then an error message is returned to the client to select another photo or try to reload the current image.

It is a preferred embodiment of the present invention where the client's digital image ranges in size from about 1 KB to about 200 MB. The client's photo must be at least one megapixel in size in order to ensure a clean and clear print image on the canvas.

It is an embodiment of the present invention where a client may upload more than one digital image to the server. However, if the client has uploaded multiple images to the server 14, the server 14 returns the small compressed images to the client's computer 11 as a digital image matrix, having each compressed thumbnail comprising rows and columns presented to the client or can be streamed as a photo show in photo managing software installed on the client's computer 11. As such, there is no reason for the client to download their large image file from the server 14 to continue the ordering process. This saves the client's computer 11 resources and makes the web based process run smooth and quickly.

Client Order—Step Two: Image Verification and Print Size

The second step for creating a client order includes the board maker's web site presenting a web page with a compressed image of the uploaded photo in the client's browser, where HTTP/PHP/Javascript protocols load the compressed digital image and resizing input forms. Presenting the client with a compressed image ensures the client that the correct image was saved to the server 14.

The client is presented with the image information including but not limited to the number of megapixels for the original image and a width to height ratio for the compressed image as compared to the original. The client can select the width and height of the photo from preselected sizes or select a custom width and height from approximately 8" (W)×8" (H) to about 48" (W)×96" (H). Resizing options for a digital image correlate to the size of the printed image on the canvas' top surface.

An image uploaded to the server 14 can be quite large. This can have positive and negative aspects. A non-limiting example of a positive aspect being, larger image files render shaper reproductions for printing onto the canvas. However, large image files take up an extremely large amount of resources, e.g. an 8 mega pixel photo would take roughly 100 MB to 150 MB of RAM (computer 11 resources) in order to show in a web browser. Web browsers are not meant to handle such large files, and this can lead to the client's 11 computer slowing down to a crawl or cause the browser to crash.

Compression modules at the server 14 reduce the size of the original uploaded image. It is within the scope of the present invention wherein digital image compression at the server 14 truncates an image file to thumbnail size. The truncated image may be reduced from about 8 KB to roughly about 15 to 20 KB to maintain optimal internet connection speed at the client's computer 11, but this can change to a larger size to show better quality if the internet connection speed increases.

At least two compressed images, one smaller than the other, are generated and stored in the client matrix at the server 14. Modules that compress large digital images are well known in the arts. Compression algorithms/modules may compress photos into formats including without limitation JPEG, TIFF, PNG, GIF, and the like. Once the thumbnail image is verified, the client is presented with resizing options for the original uploaded image. Resizing selections are sent to the server 14 and placed into the client matrix.

Client Order—Step Three: Framing Options

After confirming the digital image via a thumbnail returned by the server 14 and selecting the size of the printed image/canvas, the client is presented with a web page to select from various framing options for their canvassed bulletin board. At this stage, the client should understand that it takes a little bit of time to load up the framing application that will show various framing options. With this in mind, a larger file (roughly 1000×1000 pixels) with a file size of around 20 KB to about 40 KB is created such that the client can see various framing options about the larger compressed image.

This webpage displays a slightly larger thumbnail of the original photo along with the ability to demo and select various decorative frames. The client simply moves the mouse over various animated cut outs of decorative frames. This process allows the client to demo the most aesthetically pleasing frame to border their canvassed self-healing bulletin board. Animating frame options is possible by well known flash scripts used in the art, where one might use Flash/XHTML/Javascript/PHP to render the animation at the board maker's site. Wherever the mouse is positioned, that frame will automatically border the thumbnail. This gives the client a quick demo of how their picture will look with that decorative frame.

Client Order—Step Four: Payment and Order Confirmation

The final web page presented by the server 14 to the client's browser collects the client's information and completes the order process. The cost of creating the bulletin board and the method of shipment are also presented to the client on this web page. Client information may include without limitation the client's name, delivery address, zip code, credit card number, email address, the original digital image file number, compressed files of the original digital image, and the selected size for image printing. This information is housed in a database capable of rendering SQL modules at the server 14 in an XML script containing the metadata for the client's order. Once all fields are complete, the client clicks a button that enables server 14 side modules rendering Javascript, CSS, DOM, SWFupload, PHP, XHTML, and MySQL scripts to import and organize all client information, including the original digital image and compressed thumbnails, into the client matrix at the server 14.

Payment is charged to the client's credit card, an order confirmation email is sent to the client's email address containing the order information, and the board maker converts the digital image into a canvassed bulletin board that self heals.

The Client Order to Printed Canvas

Once client information is stored onto the server 14, the board maker confirms the information and downloads the client's original image into a file on his or her computer 15. With out saving the original file, the client's image will not be printed cleanly onto the canvas surface as the files being shown to a client are highly compressed Unlike text that can be compressed in a zip file and then uncompressed and be shown in its original form and glory, an image file gets compressed by throwing out information, and there is no way to retrieve the lost information. As such, the full original image uploaded to the server 14 is used to print on the canvas.

Figure 2:
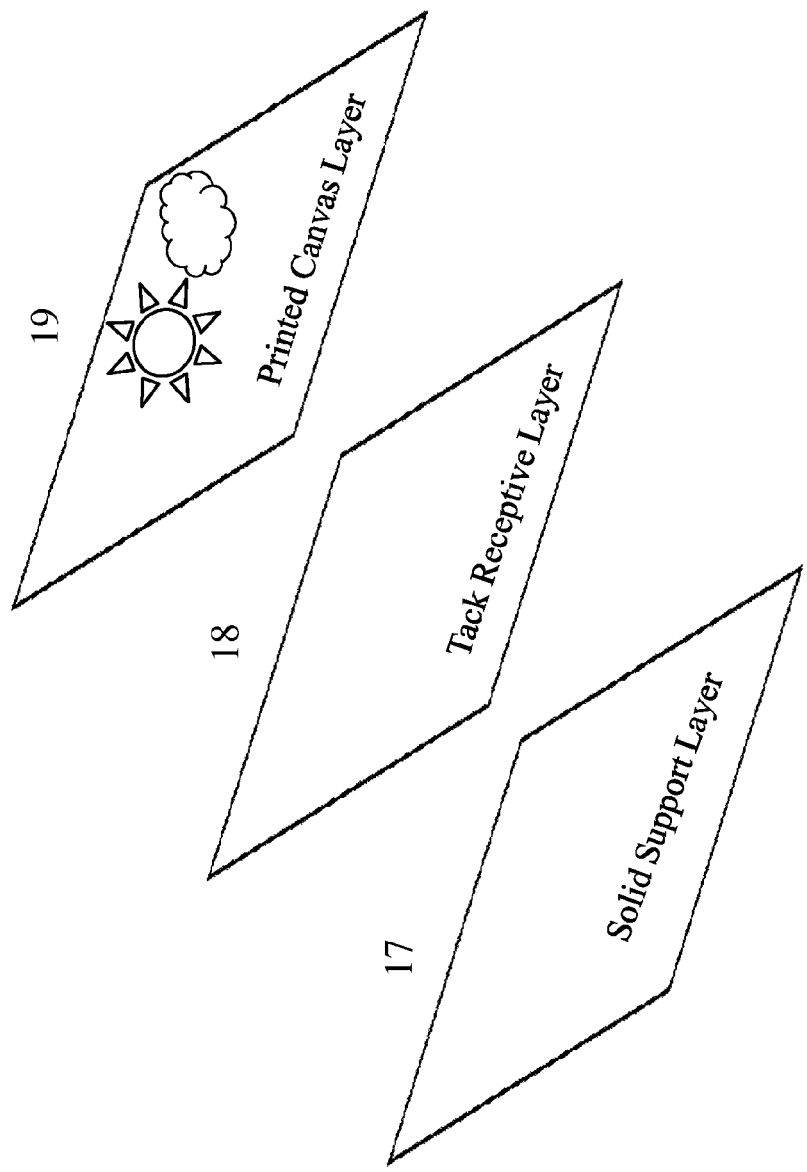
FIG. 2 is an explosive view of an unframed canvassed bulletin board, with a solid support layer 17, a tack receptive layer 18, and a printed canvas layer 19, where the layers are cemented by an adhesive.

Referring to both FIG. 1 and FIG. 2, the original image, now in the board maker's computer 15, is uploaded into image software, e.g. Photoshop, Paint Shop Pro, or the like, and resized according to the client's order. The resized image is then transferred to a commercial printer 16 capable of printing solvent inks onto a cotton canvass, other fabrics, films, vinyls, banners, or specialty media.

It is within the scope of the present invention where the printer 16 is interfaced with the board maker's computer 15 or can be used in a peer to peer network, a non-limiting example being an Epson GS600 or a comparable printer. The board maker's computer must be at least a 3 to 4 GHz processor, have an up to date operating system, at least 30 GB of free disk space for printer software and processing files, a USB connection, and an internet connection.

The printer 16 of the present invention includes a media bar/scroller capable of accepting a roll of cotton print canvas. The fabric used for the canvas includes a poly-cotton osnaburg or polyester nonwoven fabric that mimics an artist's canvas, e.g. poly-cotton hybrid, where the vinyl may be 17 ounces per lineal yard and the cotton may be about 3 ounces per lineal yard, and where the vinyl is bound to the back surface of the cotton canvas via an adhesive known in the arts. The fabric thickness may be from about 0.015 inches to about 0.030 inches.

The printer 16 receives a print instruction from the board maker's computer 15 including the original uploaded image and the print size dimensions for the image. The printer 16 then prints the image onto the canvas layer 19 using solvent based inks The board maker removes the printed canvas 19 from the printer 16 and allows the image to dry in a cool place away from sunlight. Once dried the printed canvas layer 19 is cemented to the bulletin board with an adhesive.

From FIG. 2, the canvassed bulletin board includes a solid support layer 17 composed of a sturdy material; a tack receptive layer 18 composed of an elastic self healing material, e.g. cork; and a printed cotton canvas 19 having the print of the client's digital image on the top surface. The solid support layer 17 and the tack receptive layer 18 are sized and cut to fit the dimensions of the printed canvas 19.

The solid support layer 17 may be made from materials including but not limited to an engineered wood product that is made out of wood fibers from about ¼ inch to about ½ inch in thickness. The solid support may also include a particle board, a medium-density fiberboard, or a hardboard, where push pins may penetrate through the solid support layer 17.

The tack receptive layer 18 may be made from porous materials that permit the insertion and removal of pins, including but not limited to a cork sheet or a cork hybrid sheet having polymer or rubber particulates. Either cork sheet should have a thickness from about an ⅛ inch to about ¼ inch. The tack receptive layer 18 may be bonded to the solid support layer 17 by adhesives known in the arts, including but not limited to super bonding adhesives for attaching thin films, foils and fabrics to other materials, a non-limiting example being 3M Super 77 Multi-Purpose Adhesive.

The back surface of the printed canvas 19 may be bonded to the tack receptive layer 18 by adhesives known in the arts, including but not limited to super bonding adhesives for attaching thin films, foils and fabrics to other materials, a non-limiting example being 3M Super 77 Multi-Purpose Adhesive.

The four outer sides of the canvassed self-healing bulletin board can be framed. Frame constructions are known in the arts. They are typically assembled from molding formed into rectangular units for holding art work or photographs having an upper frame section, a lower frame section, and side sections that are appropriately joined at mitered corners to form a rectangular frame. The frame may be made from various materials including but not limited to wood, metals, and plastics, where all are capable of receiving or have decorative finishes. The back of the frame may be associated with hanging fasteners, hanging wires, hooks, nails, or the like for hanging the bulletin board to a wall.

It is within the scope of the present invention where the client may select a printed canvassed bulletin board without a frame and consisting solely of the support layer 17, tack receptive layer 18, and printed cotton canvass layer 19 but can be hung or placed on a wall surface.

Once framed and completed, the canvassed self-healing bulletin board is delivered by the board maker to the client by a delivery service, e.g. the U.S. mail or FedEx or the like, or the client may alternatively receive the finished board from the board maker's shop.

The foregoing words describe one embodiment for a system and method to convert a client order into a canvassed self-healing bulletin board. However, these words are not a limitation on the scope of the present invention, but are written to detail certain embodiments thereof. It should be understood that changes may be made to the solid support layer 17, the tack receptive layer 18, the printed cotton canvas layer 19, the printer 15 type, or ink type without departing from the scope of the invention, thus, the scope of the present invention is defined solely by the following claims.

What is claimed is:

1. A method for creating a self-healing bulletin board the steps comprising:
   a.) uploading a digital image over a Network from a first computer into a matrix located on a remote server;
   b.) compressing the digital image into a thumbnail by the remote server and then sending the thumbnail to the first computer for verification, wherein the remote server presents resizing options to the first computer for selection;
   c.) returning a verification of the thumbnail and at least one selected resizing option for the original uploaded digital image from the first computer to the remote server;
   d.) after receiving verification and selection of at least on resizing option, resizing, by a second computer the original uploaded digital image from the remote server to create a resized digital image and sending the resized digital image to a printer in communication with the second computer;
   e.) printing, by the printer, the resized image onto a canvas with solvent based inks;
   f.) forming the self-healing bulletin board by:
      i.) bonding the canvas having the resized image printed thereon to a tack receptive layer; and,
      ii.) bonding the tack receptive layer to a solid support.

2. The method of claim 1, wherein the canvas has 3 oz. per lineal yard of poly-cotton osnaburg and 17 oz. per lineal yard of vinyl materials, where the canvas has a thickness from 0.015 inches to 0.030 inches, where the canvas' top surface can absorb solvent based inks, and where the canvas' back surface comprises the same poly-cotton osnaburg adhered to a vinyl based polymer.

3. The method of claim 2, wherein a printer applies solvent based inks to print the uploaded digital image onto the top surface of the canvas layer.

4. The method of claim 2, wherein the tack receptive layer is a cork sheet or a cork hybrid sheet having polymer or rubber particulates, where each cork sheet is an ⅛ inch to a ¼ inch in thickness.

5. The method of claim 2, wherein the solid support may be made from a wood fiber, a particle fiber, or a hard wood fiber, where the solid support is a ¼ inch to a ½ inch in thickness.

6. The method of claim 1, wherein the self-healing bulletin board comprises a canvas being a poly-cotton hybrid.

7. The method of claim 1, wherein the original uploaded image ranges is size from 1KB to 200 MB and is at least one mega pixel in size.

* * * * *